United States Patent [19]

Sims

[11] Patent Number: 5,157,838
[45] Date of Patent: Oct. 27, 1992

[54] VEHICLE AXLE ALIGNMENT INSTRUMENT AND METHOD

[75] Inventor: John D. Sims, Ontario, Canada

[73] Assignee: Michelin Recherche et Technique, Fribourg, Switzerland

[21] Appl. No.: 818,941

[22] Filed: Jan. 10, 1992

[51] Int. Cl.$^5$ .............................................. G01B 73/195
[52] U.S. Cl. .................................................. 33/203.18
[58] Field of Search .................... 33/203.18, 203, 193, 33/203.12, 203.19, 203.2, 288; 356/155

[56] References Cited

U.S. PATENT DOCUMENTS

| | | |
|---|---|---|
| 3,181,248 | 5/1965 | Manlove . |
| 3,624,914 | 12/1971 | Kosteriva ..................... 33/203.18 X |
| 4,115,926 | 9/1978 | Hampton et al. ..................... 33/288 |
| 4,239,389 | 12/1980 | Hollandsworth et al. . |
| 4,261,108 | 4/1981 | Davis ........................... 33/203.18 X |
| 4,319,838 | 3/1982 | Grossman et al. . |
| 4,337,581 | 7/1982 | Eck . |
| 4,341,468 | 7/1982 | Hollandsworth et al. . |
| 4,381,548 | 4/1983 | Grossman et al. . |
| 4,629,317 | 12/1986 | January et al. . |
| 4,854,702 | 8/1989 | Stieff . |
| 4,898,464 | 2/1990 | Thorne et al. . |
| 4,942,667 | 7/1990 | Fournier ............................... 33/288 |

FOREIGN PATENT DOCUMENTS 2467385 4/1981 France .
2562656 10/1985 France .

Primary Examiner—Harry N. Haroian
Attorney, Agent, or Firm—Robert R. Reed; Greg Strugalski; Alan A. Csontos

[57] ABSTRACT

Axle alignment for a tractor-trailer vehicle combination is important for tire wear, fuel economy and driver fatigue. Misalignment occurs when the tractor thrust line vectors (one perpendicular to each drive axle) has a skew angle with respect to a longitudinal reference axis of the tractor. In addition, the tandem axles of a dual axle combination must be parallel to minimize scrubbing between the tires and the roadway. The same problems exist when the trailer drag line vectors (one perpendicular to each trailer axle) are not aligned with a longitudinal reference, and the dual axles are not parallel, due to axle misalignment.

The instrument and method of this invention are components of an alignment system for making accurate alignment adjustments to the vehicle. The instrument is compact, light weight and portable. Also, only one instrument is required to establish location points on the reference surface supporting the vehicle. A computer uses distances between location points to determine the relative position between axles and displays axle geometry on a monitor. Adjustments in the axle positions are provided based for the type of vehicle suspension system.

21 Claims, 6 Drawing Sheets

VEHICLE AXLE ALIGNMENT INSTRUMENT AND METHOD

BACKGROUND OF THE INVENTION

1) Technical Field

This invention is concerned with a portable apparatus and method for diagnosing truck and trailer axle alignment and determining desired axle adjustments.

2) Background Information

The tractor as well as the trailer in a tractor-trailer vehicle combination often have a problem maintaining axle alignment. The problem results from the axles not being perpendicular to the fore-and-aft centerline of the frame of the tractor, as well as the trailer axles not being perpendicular to the trailer frame centerline. Also, the axles are generally not parallel and two adjacent tractor drive axles, or two adjacent trailer drag axles, have a tandem scrub angle when misaligned relative to each other.

These problems result in excessive tire wear, a reduction in fuel economy and driver fatigue.

The highest operating expense next to operator salaries and fuel costs for class 7 and 8 vehicles is the tire related expense. The Maintenance Practices Council for the American Trucking Association of Alexandria, Virginia publishes the recommended maintenance practice "RP-207" for periodic axle alignment verification. This recommended practice defines the desired relationships for proper axle alignment to maintain parallelism along with proper thrust line and drag line orientation.

A system for checking truck or trailer axle parallelism by a means for projecting the centerline of the axle end portion to a real or imaginary reference surface, using an apparatus attached to each wheel, is common in the trucking industry. Various manufacturers provide systems and apparatus including Hunter Engineering Co. of Bridgeton, Miss. Kansas Jack, Inc. of McPherson, Kans. Bee Line Company of Bettendorf, Iowa, Axle-Tru, Inc. of Columbia City, Ind., Bear Automotive Service Equipment Company of Milwaukee, Wis. and Meyers Tire Supply of Akron, Ohio. These systems and components have varying degrees of complexity and size. Most systems are used by specialty service companies and are not portable or cost effective systems for a trucking fleet or the field service personnel of truck and tire manufacturers. One apparatus which is somewhat portable is the Fiaky apparatus shown in FIG. 1. This device 10, to define the axle centerline and project it to a location on a reference surface 8, is distributed by M. Muller and Company of Paris, France. The disadvantage to this apparatus is that multiple devices 10 are required to locate each axle being investigated. Also then end 40 of the axle 6 has a location 42 on the reference surface 8 which is axially interior to the tire 4 requiring the vehicle to be moved to identify this location 42.

Examples of sophisticated electronic systems and apparatus are disclosed in the U.S. Pat. No. 4,629,317, U.S. Pat. No. 4,337,581 and FR 2467385. Electronic devices include light emitters, reflector devices and receivers or tagets. They combine sensor signals to measure and display specific alignment parameters using a common geometric reference, such as the vehicle body centerline and the wheel axis of rotation. A typical problem with electronic devices is the relative ease with which a beam of light can deviate from a perpendicular relationship to its support and consequently the wheel axle centerline.

Various means for computing and displaying axle alignment parameters are disclosed in the U.S. Pat. No. 4,319,838, U.S. Pat. No. 4,381,548, and U.S. Pat. No. 4,898,464. A computer is easily programmed to store axial alignment parameters, vehicle suspension geometry and the adjustments possible for each type of suspension system available from manufacturers. The computer calculates the relative position of axles from relative distances between locations at axle end portions in U.S. Pat. No. 4,381,548. Computations can either be online from electronic signals fed directly to the control microprocessor and CRT display (U.S. Pat. No. 4,898,464) or offline by keying dimensions into the computer and providing a graphical display on a monitor, as used in this invention.

Means for supporting alignment devices at the wheel of the vehicle are disclosed in the U.S. Pat. No. 3,181,248, U.S. Pat. No. 4,115,926, U.S. Pat. No. 4,239,389, U.S. Pat. No. 4,337,581, U.S. Pat. No. 4,854,702 and FR 2562658. The mechanical device of U.S. Pat. No. 3,181,248 includes interconnections between wheels transversely and longitudinal. This device would not be very portable. Numerous support means (U.S. Pat. No. 4,239,389, U.S. Pat. No. 4,337,581, U.S. Pat. No. 4,854,702 and FR 2562658) have wheel rim contact devices. A support means contacting the wheel rim must be independent of any deviations of the wheel from a true plane of the wheel rotation whereby mechanical tolerances in the wheel, as well as in the instrumentation components, must be accounted for without interferences in the measured results. The U.S. Pat. No. 4,115,926 has a magnetic mounting clamp 17 which remains aligned with the wheel axis extension. This clamp is used for toe adjustments of the front wheel of an automotive vehicle and would not be appropriate for the wheels of a truck. Any modification for use on trucks would not be easily portable and a different clamp would be necessary for steering, drive and trailer axles.

U.S. Pat. No. 4,239,389, U.S. Pat. No. 4,319,838 and U.S. Pat. No. 4,854,702 cited previously disclose a spirit level or bubble device to position and associated part of the support means in a horizontal plane. The primary purpose of these leveling devices is to allow for radial runout and to nullify physical inaccuracies of wheel rims in the adjustment systems.

U.S. Pat. No. 4,239,389 and FR 2562658 cited previously disclose the use of a rod approximately perpendicular to the plane of the wheel. These rods are adjusted to become coextensive with the vehicle axle centerline in a horizontal plane or perpendicular to the wheel plane of rotation. These rods are not necessarily collinear or parallel with the axle centerline.

An alignment of the vehicle thrust line effect of a nonsteerable wheel, or pair of wheels associated with one drive axle, is discussed in the U.S. Pat. No. 4,341,468 and U.S. Pat. No. 4,942,667. A combination of an electronic device 12 and a mechanical frame 22 with centering elements 28 and 30 is disclosed for aligning the axles of a tractor or trailer in U.S. Pat. No. 4,942,667. Axles become misaligned due to bends, bows, twists and other irregularities in vehicle frames as well as assembly tolerances in the suspension system during manufacture. The centering elements of this patent are not precision devices for accurate axle centerline projections and the system is not very portable. In addition, there is no disclosure for making drive axles parallel by using this system, and doing this is not obvious.

SUMMARY OF THE INVENTION

The truck-trailer alignment system disclosed herein is a simple and easy way to accurately determine the axle alignment condition of a class 6, 7 or 8 vehicle without using expensive alignment equipment and a truck bay to perform the work. In fact any planar surface of concrete or asphalt, either inside or out, is all that is required. In addition to determining the axle alignment condition of a given vehicle, the system will advise what action is necessary to correct an improperly aligned vehicle.

This invention is the result of efforts to provide field engineering groups and fleet owners with a tool to easily check a vehicle suspected of prematurely wearing out tires as a result of axle misalignment. The use of both the hardware (the instruments themselves) and the software (the computer program required to process the resulting information) is disclosed within the scope of this invention.

The objective is to provide a simple portable mechanical means to obtain the relative distances between axle locations which are used to calculate relative positions of vehicle axles and to output instructions for making adjustments. This invention allows mechanics to adjust the structural components of the suspension system with sufficient accuracy to significantly improve tire life, fuel economy and driver fatigue.

The preferred embodiment of the invention includes a method for determining a relative position of a pair of vehicle axles. The method comprises the following steps. An instrument is provided having a member extending therefrom. The instrument is connected with each axial end of an axle of the vehicle so the member extends parallel to the axle whose relative position is to be determined. A location is indicated vertically below an end of the member at each axle end of the axle. This location is axially outward of the axial extent of the tire and onto a reference surface on which the vehicle is supported. Relative distances are established between selected pairs of the locations indicated above. The relative position between a pair of vehicle axles is calculated as a function of the established distances. Relative positions between axles are calculated to provide axle alignment adjustments.

The invention includes an instrument or apparatus used in determining the relative position between a pair of vehicle axles. The instrument indicates a location of each end of a vehicle axle onto a reference surface. The instrument is a part of the alignment system and comprises the following components. A contact pin defines an end of the vehicle axle at the drive axle wheel of the tractor which is accessible from the exterior of the vehicle. A first bracket is attached to the contact pin with a first clamping device. The first bracket has a magnetic anchor device that engages an end portion of the axle and supports the instrument for the tractor wheel. This first bracket has a circular shaped slot. This circular slot is in a plane perpendicular to the axle with the center of circular radius being at the vehicle axle when the first bracket is attached to the contact pin at the end of the axle. The first bracket of the trailer has holes for attachment and support by two trailer wheel hub bolts. Otherwise the trailer instrument is the same as the tractor instrument.

A second bracket has a projection that is positioned within the circular slot and free to rotate in a plane perpendicular to the axle when it is attached to the first bracket. The second bracket has a second clamping device to fix the relative position of the first and second brackets. A member fixed to the second bracket has an axis parallel to the vehicle axle. The member is positioned below the vehicle axle in a vertical plane containing the axle by using a leveling means with an adjustable attachment means to the second bracket.

An indicator device is attached to an end of the member by a means that allows it to be detached. The indicator device has a means for providing the location on the reference surface directly below the end of the member. The location is outward of the axial extent of the tire in a vertical direction from the end of the member. A plurality of locations, being one location at each end of each axle, are used to align a pair of vehicle axles as discussed in the method disclosed above.

The relative position between locations provided by the instrument for selected pairs of the locations indicating two axles form a general quadrilateral on the reference surface. A sum of the interior angles of this quadrilateral can be controlled within ±0.25 degrees using this instrument. Furthermore, a pair of vehicle axles can be adjusted within 0.10 degree of being parallel using the instrument to determine locations for establishing distances used to calculate the adjustment.

BRIEF DESCRIPTION OF THE DRAWINGS

Further features of the present invention will become apparent to those skilled in the art. The present invention relates from reading the specifications and is illustrated in certain embodiments set forth in the accompanying drawings, wherein.

DETAILED DESCRIPTION OF PREFERRED EMBODIMENTS

Vehicles of concern in this description are various truck and tractor-trailer combinations. Typical truck or tractor configurations include the 6×4 and the 4×2. These tractor-trailer combinations are Class 6, 7 and 8 vehicles as defined by the American Trucking Association. Trailers include the single and multiple rear axle combinations. The front trailer axle can be a steerable axle or a kingpin connection to the fifth wheel of the tractor.

Vehicle axle alignment involves adjusting the position of axles with regard to a reference. This reference can be the centerline of the vehicle frame in the longitudinal direction or a reference axis assumed to have a correct position. For the preferred embodiment of this invention, the reference is a line connecting the midpoint of the most rearward axle and the midpoint of the most forward axle of the vehicle. This is true for both the tractor and the trailer. However, the forward point on a trailer being pulled by the fifth wheel of a tractor is the kingpin.

When an axle does not have the proper position with respect to the reference it is misaligned. The misalignment may be the result of a number of different physical problems. These problems include manufacturing tolerances, normal wear of the suspension system, physical abuse, rough surfaces and lack of periodic maintenance and repairs. Misalignment can be quantified by the thrust line or drag line of each axle. The trust line is a vector perpendicular to the axle at its midpoint and pointing forward for the tractor driving axle (see FIG. 2). The drag line is a vector perpendicular to the trailer axle at its midpoint and pointing rearward (see FIG. 10). The angle made by the thrust or drag line vectors with respect to the reference indicates the misalignment magnitude. Another misalignment parameter is the trust or drag line scrub angle. This occurs when dual axles of a tractor or trailer are not parallel. For example, the thrust line of a front tractor drive axle may not be parallel with the thrust line of the rear tractor drive axle. The result is the front axle and the rear axle are pulling in different directions causing the tires to scrub the roadway.

The present invention includes an instrument and method for use with an alignment system. The preferred system includes:

1) a reference surface on which the vehicle is supported;
2) the instrument having a member extending from it;
3) a PC computer;
4) a diskette containing the analytical and graphical alignment programs;
5) a monitor screen connected with the computer;
6) an indicator means for vertically projecting the end of the member to locations on the reference surface;
7) a marking device for defining the locations projected;
8) a means for establishing the relative distances between locations; (i.e. a measuring tape)
9) an input device connected with the computer for recording distances in the computer and operating the program;
10) tools for making vehicle axle adjustments output by the computer and displayed on the monitor; and
11) an operations manual to describe the procedures and steps in the methodology.

The operational procedures are very simple and all system components are compact and portable. Those skilled in the art can be taught to use this system in less than one hour. A clean flat concrete or asphalt surface may be used as a worksite. This is normally an indoor bay or a garage or service building, but good results are also obtained performing the work outside.

Best results have been found if the vehicle is driven for one or two miles prior to alignment check. This will ensure the axles are in their normal relaxed positions prior to instrument installation. The vehicle should be driven onto the work site, then backed out and slowly brought back to the site again. This will ensure that the axles are in their "normal" relaxed position. The vehicle should be allowed to coast to a stop. Under no circumstances may the vehicle be stopped with brakes, as the brakes will not operate equally and some skewing of the axles will result. With the vehicle stopped, the parking brakes should be applied to ensure that the vehicle will not move. It is normally a good practice to block one or more of the wheel positions for safety considerations. With the vehicle in position, the misalignment correction work begins.

Figure 1:
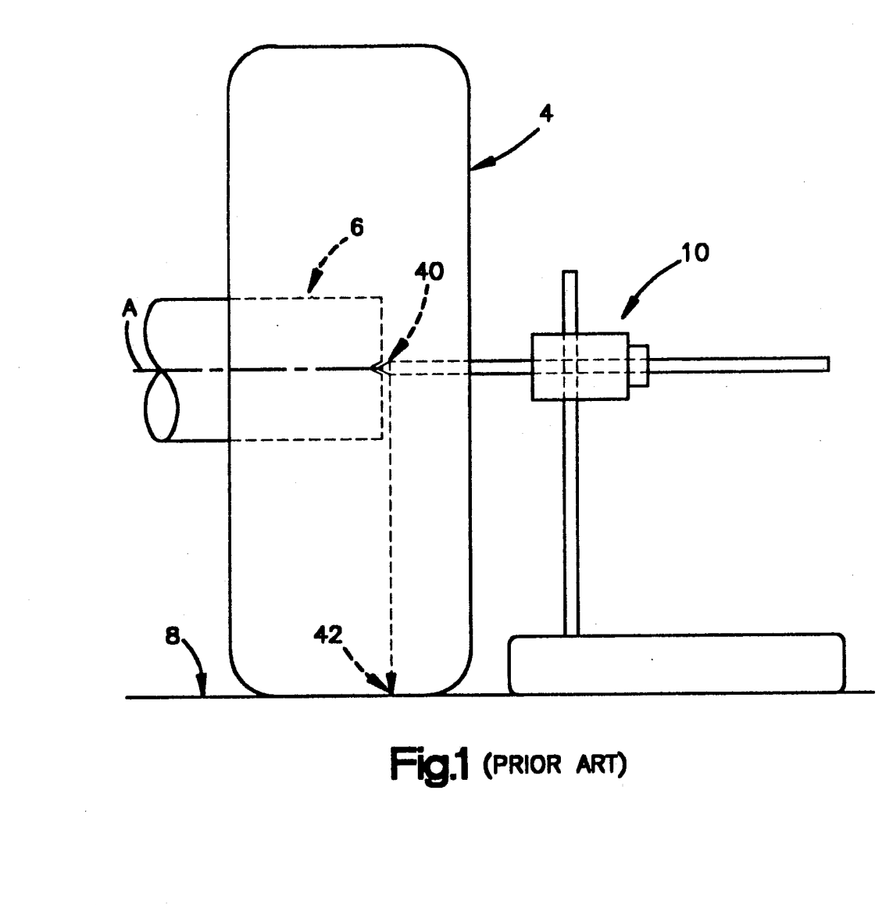
FIG. 1 is an illustration of a prior art axle centerline locator device.

The instrument is attached to each wheel and a location is placed on the surface using the vertical projecting means. The instrument of this invention is very light weight and only one is needed for the complete system. However, the instrument has one bracket for the tractor and a different bracket for the trailer axle attachment. In comparison, the Fiaky system requires a separate instrument, as shown in FIG. 1, to be positioned at each wheel. The instrument of this invention has a simple magnet attachment for the tractor bracket. The trailer bracket is clamped into position using two nuts from the hub of the trailer wheel assembly.

Locations are obtained for all axle ends to be used in calculating axle misalignment adjustments. However, the instrument cannot be used for locations at the front of the tractor or trailer. These locations are discussed below.

For the typical tractor, two symmetrical locations are E and F obtained for the steer axle using the indicator means. The preferred indicator means is a plum bob or a laser that vertically projects a visual spot or location on the reference surface.

With no front axle the trailer is considered to have a cross member, or a single midpoint coincident with the kingpin. The indicator means is also used to project two symmetrical points E and F at the front of the trailer onto the reference surface. The procedure described for the tractor is also used for the trailer. The only difference being the use of the trailer bracket as previously discussed. It is obvious from this discussion that the trailer and the tractor can be adjusted independent of each other or in combination at the same time.

With locations on the reference surface for a pair of ends of each axle, relative distances are measured. The establishing means is used to obtain the relative distances between locations. Distances are recorded and entered into the computer for analysis. The computer analyzes the displays the resulting geometry of the relative axle positions. Proper adjustments are calculated and displayed on the monitor. The program also accounts for the adjustments available for typical vehicle suspension systems provided by manufacturers.

Finally, proper adjustments are made and the work is completed. More detail on the sequencing of adjustments is disclosed later in the specification.

Having described the complete system and its operational parameters, attention is now turned to a detailed description of the instrument and method. Some variations of the system and the operations described above are within the scope of this invention.

Figure 2:
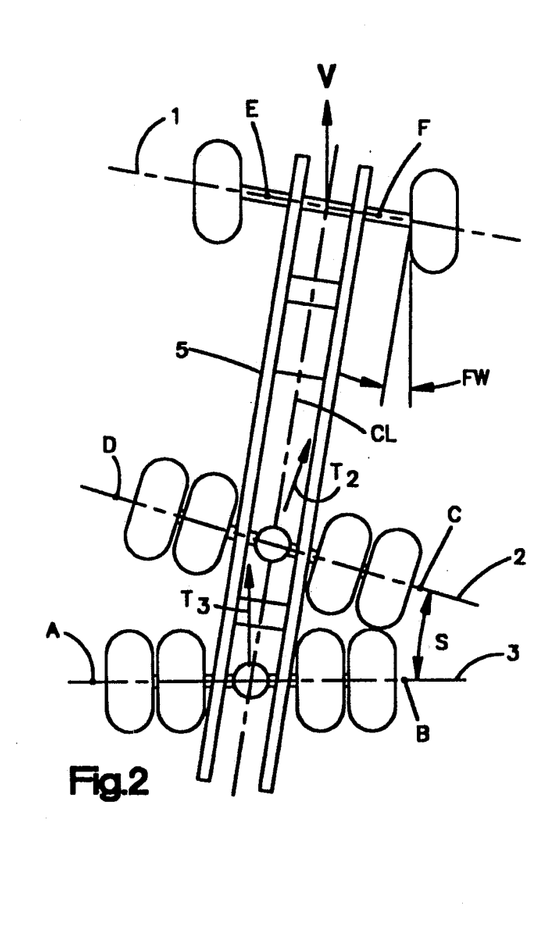
FIG. 2 is the plan view schematic of a 6×4 tractor showing axle thrust line and scrub angle misalignment.

An axle misalignment is illustrated in FIG. 2 for the tractor of a tractor-trailer vehicle combination. The steer axle centerline has steerable wheels that maintain the forward velocity V by having a steer angle FW with respect to the centerline CL of the vehicle frame 5. This steer angle FW is necessary because the front drive axle centerline 2 and the rear drive axle centerline 3 are not perpendicular to the frame centerline CL. The front axle thrust line T2 and the rear axle thrust line T3 being perpendicular to each respective axle are not parallel if a thrust scrub angle S exists between respective axles of the vehicle. This scrub angle S gets its name from the fact that the tires scrub the ground surface when it is not zero. An objective of this invention is to provide a method for determining a relative position of a pair of vehicle axles as disclosed below.

Figure 4:
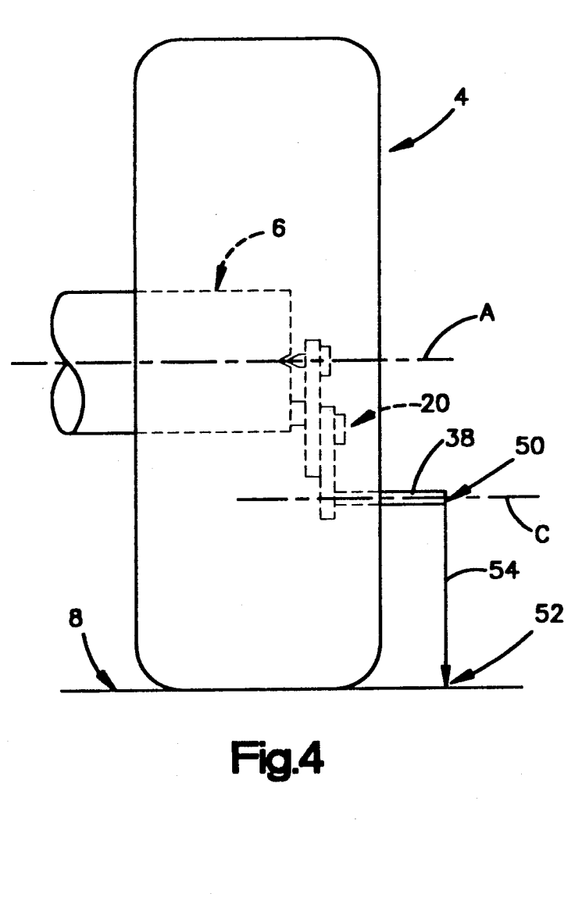
FIG. 4 is an illustration of the preferred embodiment instrument indicating a location of a drive axle on a reference surface.

An instrument 20 is provided with member 38 extending from it, as shown in FIG. 4. The instrument 20 is connected with an axial end of an axle 6 of the vehicle so the member 38 extends parallel to the axle axis A. A location 52 vertically below an end 50 of the member 38 is established using an indicator device 54 at the axle whose relative position is to be determined. The location 52 is axially outward of the axial extent of the tire 4 onto a reference surface 8 on which the vehicle is supported.

Figure 8:
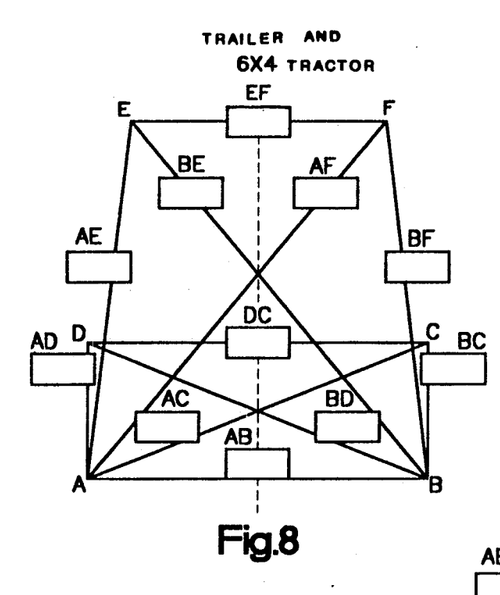
FIG. 8 is an illustration of the distances between locations for a 6×4 truck tractor or a trailer used for calculating relative positions between axles.

Relative distances are established between selected pairs of the locations as indicated. Three pairs of locations are shown in FIG. 2. The rear drive axle locations A and B as well as the front drive axle locations C and D for a 6×4 tractor are placed on the reference surface. The relative distances for this pair of axles are illustrated in FIG. 8 as AB, AC, AD, BC, BD and DC. The steer axle locations E and F are indicated without the use of the instrument. With steerable wheels the adjustment of the steer axle is not necessary. However, locations E and F are important in adjusting the thrust lines T2 and T3 (FIG. 2). Locations E and F are established using the indicator device 54 to vertically project symmetrical steer axle positions to locations E and F on the reference surface. A plum bob is the preferred device.

Figure 9:
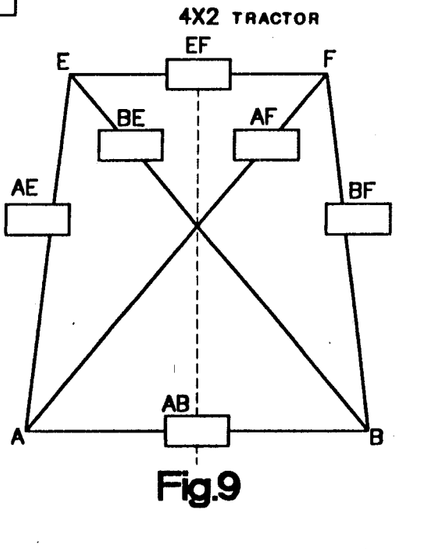
FIG. 9 is an illustration of the distances between locations for a 4×2 truck tractor used for calculating relative positions between axles.
Figure 12:
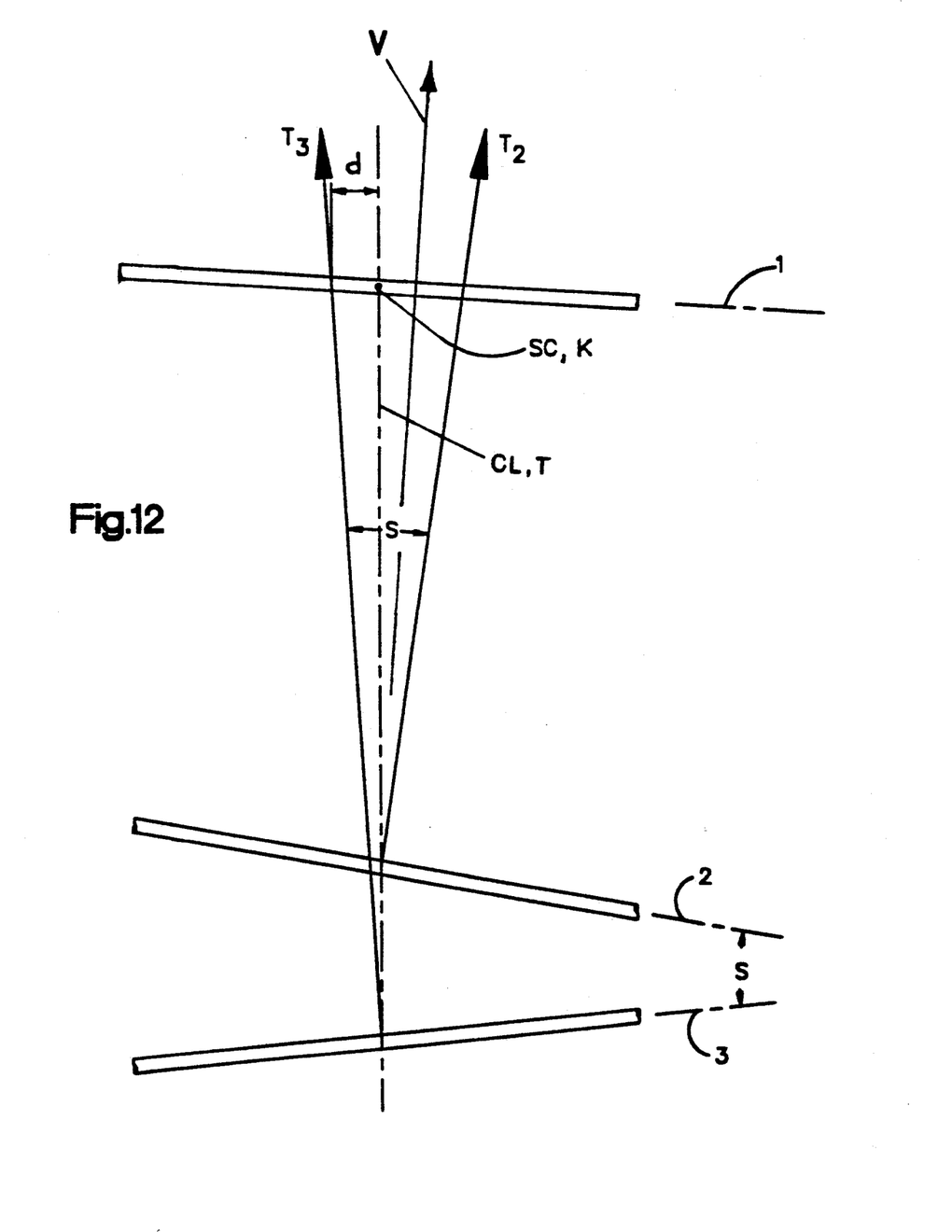
FIG. 12 is a possible graphical display output as viewed on the computer monitor.

Relative distances AE, AF, BE, AB, BF and EF are established for the steer axle and rear drive axle pair or a trailer pair. Distances for a 4×2 tractor are shown in FIG. 9. The relative positions between a pair of vehicle axles as a function of relative distances is calculated. A first relative position is calculated for the thrust line T3 deviation "d" from the geometric midpoint SC of the steer axle (FIG. 12). A second relative position is the thrust scrub angle S between the front drive axle and the rear drive axle; which is the same as the angle between perpendicular thrust lines T2 and T3. A computer can be used to calculate relative positions between a pair of vehicle axles as a function of the relative distances established.

Figure 3A:
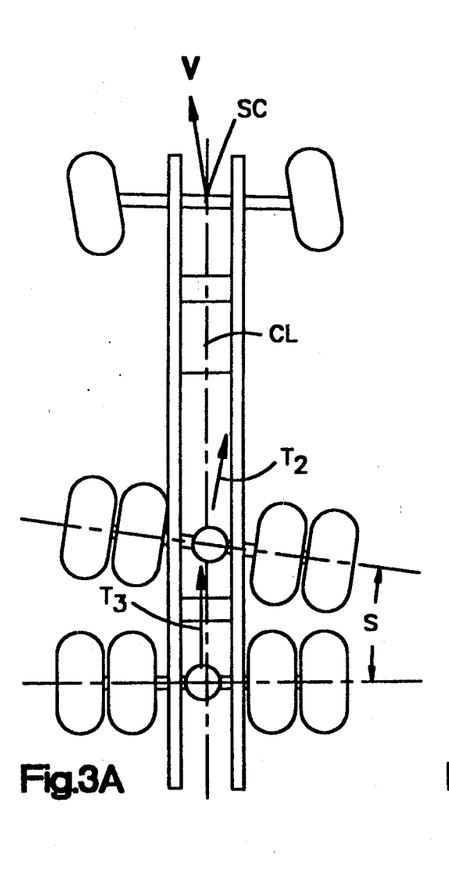
FIG. 3A is the plan view schematic of a 6×4 tractor showing a correct rear axle thrust line adjustment.

An adjustment location and distance is determined for at least one of the pair of vehicle axles as a function of the relative position of that one axle. The adjustment location is determined by the available adjustment positions for a particular vehicle suspension system. A common location is the spring to axle connection. The adjustment distance is calculated using the relative distances established above. An adjustment for the rear axle thrust line T3 position relative to the steer axle has been made in FIG. 3A. The relative position of the rear axle thrust line T3 has been corrected to pass through the steer axle midpoint SC. An adjustment correcting the thrust line angle S has been made in FIG. 3B. This adjustment corrects the misalignment problem of parallelism between axles. A computer can be used to determine each adjustment distance and location. Sufficient accuracy in adjusting the distances between locations is provided to reduce thrust line scrub angles to less than 0.10 degree. The computed adjustments can also be displayed on a monitor. A graphical display similar to FIG. 12 can be provided.

The accuracy of the method disclosed in this invention is such that four locations on the reference surface, which locates two axles, forms a general quadrilateral with interior angles within 0.25 degree of 360 degrees. The relative distances between locations is accomplished using a linear distance measuring device (laser, tape, grid system) standard in the industry.

Figure 7:
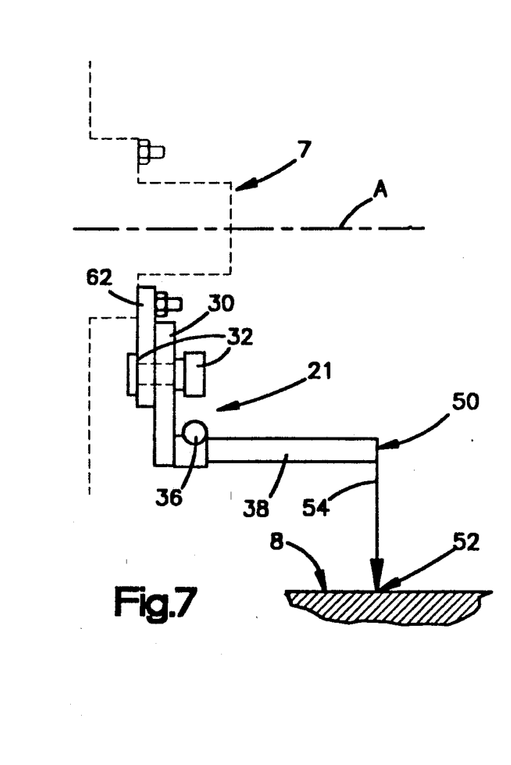
FIG. 7 is an illustration of a preferred embodiment instrument indicating a location of a trailer axle on a reference surface.
Figure 10:
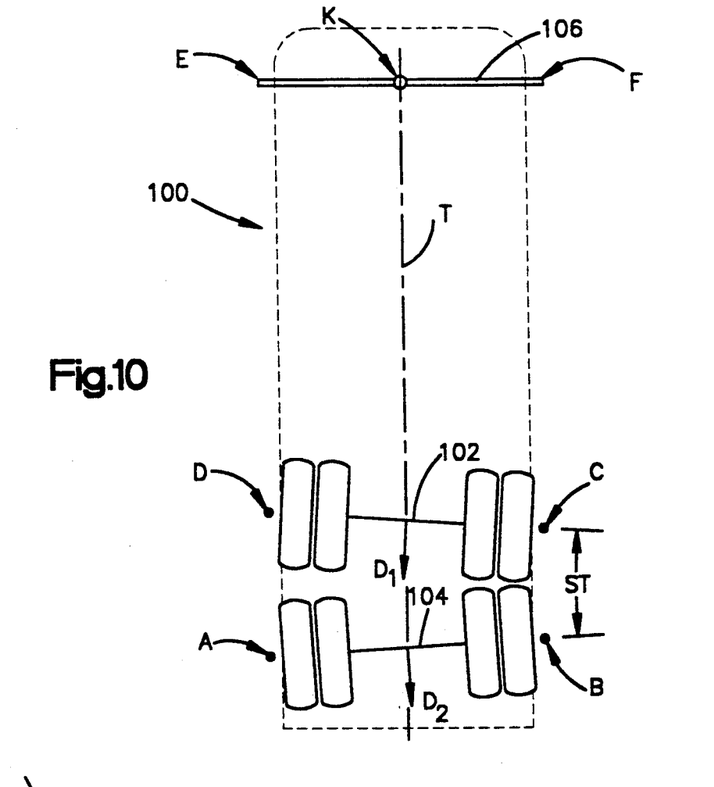
FIG. 10 is a plan view schematic of a truck trailer with dual trailer axles.

The same method applies to the truck trailer as shown in FIG. 10. The front trailer axle 102 and the rear trailer axle 104 have drag lines D1 and D2 respectively. The front locations E and F are indicated using a cross member 106 perpendicular to the trailer centerline T an passing through the trailer kingpin K. The indicator device is used to vertically project each end of cross member 106 to locations E and F on the reference surface. A plum bob is the preferred device. A modified instrument 21 is necessary for the end of the trailer axle 7 as shown in FIG. 7. The locations A, B, C, and D (FIG. 10) are indicated using the modified instrument 21 which also has a member 38 with an end 50. The location 52 is also outward of the axial extent of a trailer tire onto the reference surface 8. Establishing relative distances between selected pairs of the locations, calculating a relative position between a pair of trailer axles and determining an adjustment distance and location for at least one of the pair of trailer axles as a function of their relative position are the same as disclosed above for the tractor of the tractor-trailer vehicle combination.

The adjustment distance and location instructions for the trailer axles include a first adjustment to align the drag line D2 (FIG. 10) to project through the kingpin K. A second adjustment is to correct the lack of parallelism of the front trailer axle 102 with respect to the rear trailer axle 104.

Figure 5:
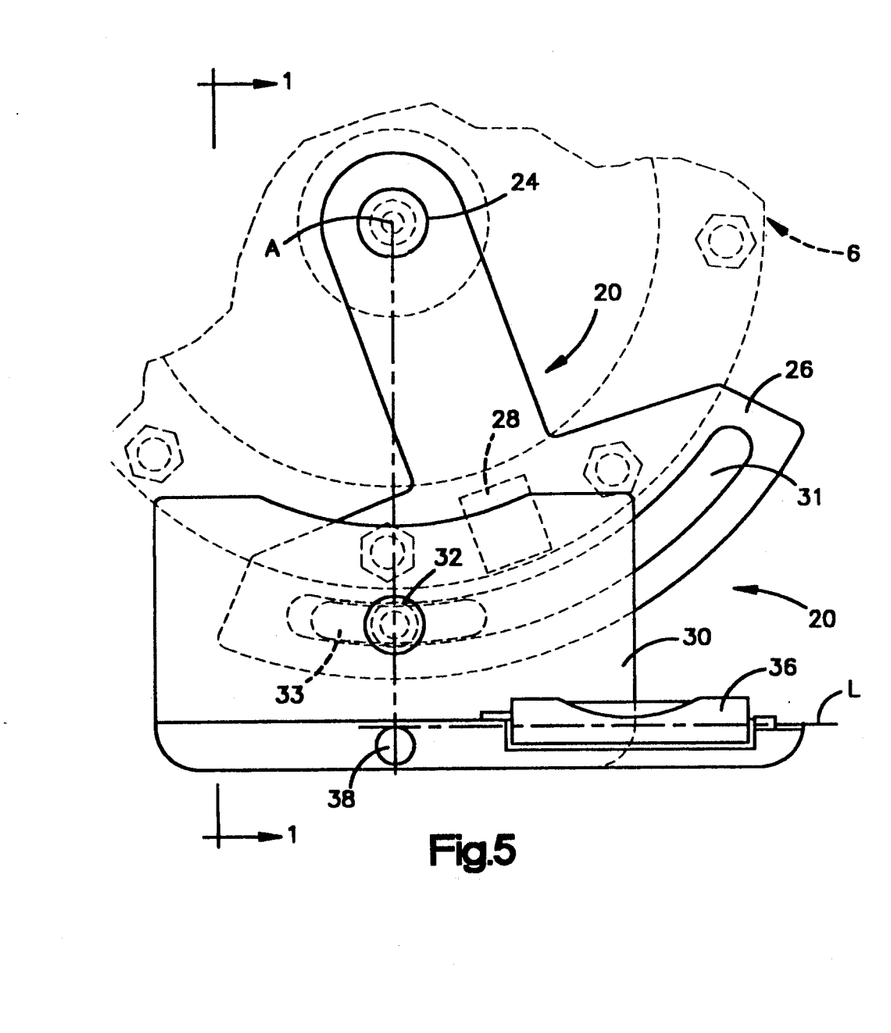
FIG. 5 is an elevation of the preferred embodiment instrument attached to the drive axle wheel.
Figure 6:
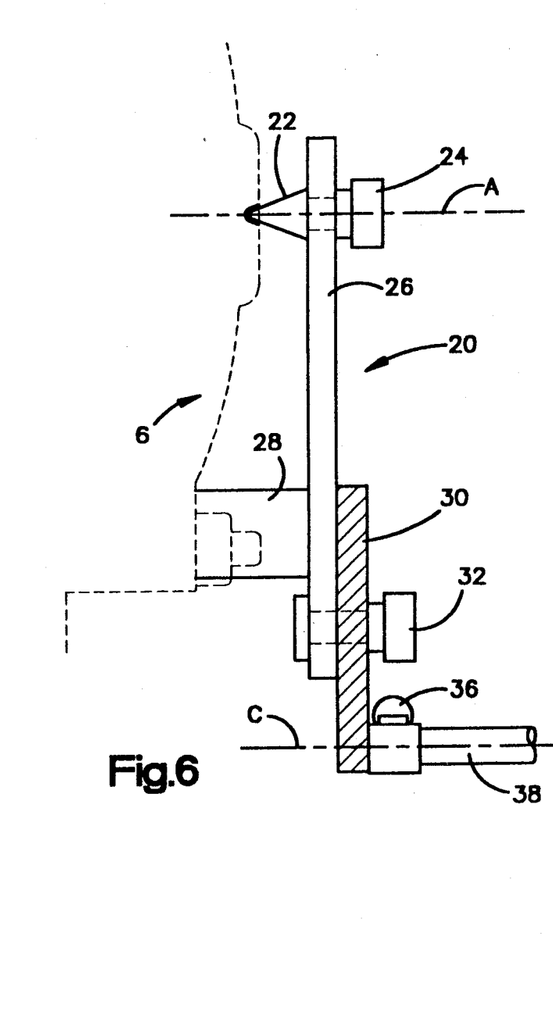
FIG. 6 is a sectional view of the instrument of FIG. 5 along a line 1—1.

The preferred instrument 20 for indicating the location of each end of the vehicle axle onto the reference surface on which vehicle is supported is shown in FIGS. 5 and 6. A contact pin 22 defines the end of the vehicle axle 6 at a wheel which is accessible from the exterior of the vehicle axle axis A. A first bracket 26 is attached to the contact pin 22 with a first clamping device 24 and has a magnetic anchor device 28 at an end of the axle 6 which supports the instrument 20. The magnetic anchor device 28 may be detachable from the first bracket 26 as an alternate embodiment for portability of the instrument 20. The first bracket 26 has a circular shaped slot 31 with respect to a plane perpendicular to the axle axis A when the first bracket 26 is attached to the contact pin 22. The center of the slot 31 radius is at the vehicle axle axis A.

A second bracket 30 has a projection 33 that is positioned with the circular shaped slot 31. The second bracket 30 is free to rotate in a plane perpendicular to the vehicle axle when it is attached to the first bracket 26. A second clamping device 32 is designed to fix the position of the second bracket 30 with respect to the first bracket 26.

A member 38 is fixed to the second bracket 30 with its axis C parallel to the vehicle axle axis A. The member 38 is positioned below the vehicle axle in a vertical plane containing said axle axis A by using a leveling means 36. The leveling means 36 is adjustably attached to the second bracket 30. The axis L of the leveling means is adjusted to be perpendicular to the vertical plane containing the axle axis A and member 38.

An indicator device 54 is attached to an end 50 of the member 38 as shown in FIG. 4. The indicator device 54 is detachable from member 38 for portability. The indicator device 54 has a means for providing the location 52 on the reference surface 8 vertically below the end 50 of member 38. The location 52 is axial outward of the axial extent of the tire 4. A plurality of location 52, being one at each end of each axle, are used to align a pair of vehicle axles as previously disclosed.

Figure 11:
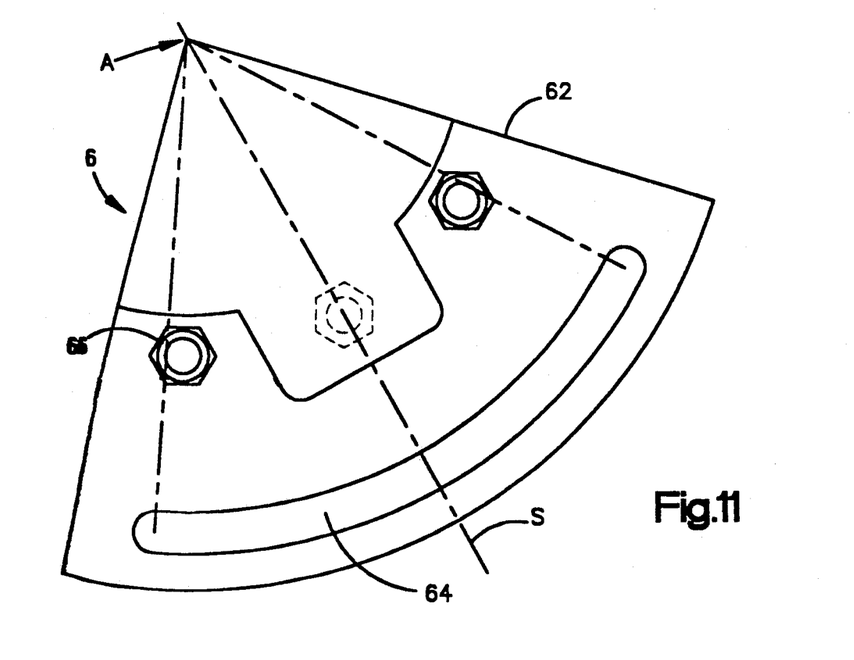
FIG. 11 is the elevation view a modified segment bracket used with the truck trailer instrument.

A modified first bracket 62 is required for trailer axles 102 and 104 as shown in FIGS. 10 and 11. The modified first bracket 62 is attached to vehicle axle 7 (FIG. 7) using the existing flange attachment bolts 66 of the axle end 7. The modified instrument 21 uses the same second bracket 30, second clamping device 32, member 38 and leveling means 36 as the instrument 20. The circular slot 64 (FIG. 11) is positioned the same as the circular slot 31 (FIG. 5) with respect to the vehicle axle axis A.

Figure 3B:
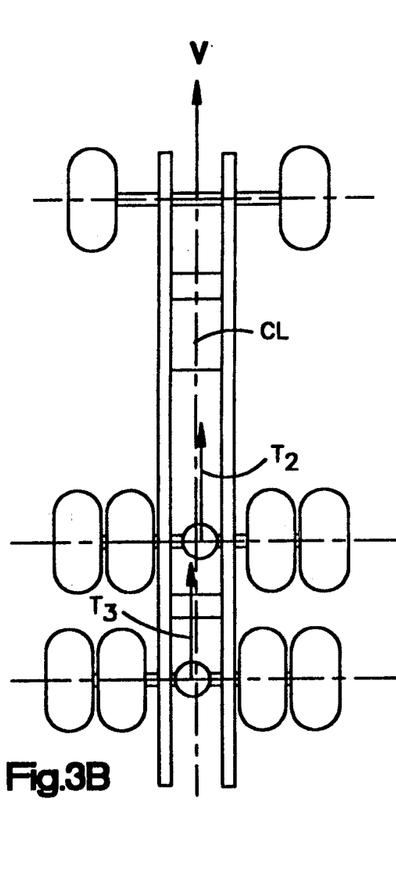
FIG. 3B is the plan view schematic of a 6×4 tractor showing the final alignment after proper adjustments.

The preferred embodiments disclosed for the alignment instrument and method can have changes and modifications within the scope of this invention. For example, an alternate method exists in the procedure disclosed in making alignment adjustments. First, the front drive axle can have its thrust line T2 positioned to project through the midpoint SC of the front axle (FIG. 3B). This is followed by the adjustment of the rear drive axle to be parallel to the front axle to make the thrust line slip angle S approximately zero.

From the above description of preferred embodiments of the invention, those skilled in the art will perceive improvements, changes and modifications. Such improvements, changes and modifications within the skill of the art are intended to be covered by the appended claims.

Having described preferred embodiments of the invention what is claimed is:

1. A method for determining a relative position of a pair of vehicle axles, said method comprising the steps of:
    providing an instrument having a member extending therefrom;
    connecting the instrument with each axial end of a non-steerable axle of the vehicle so the member extends parallel to the axle whose relative position is to be determined;
    indicating a pair of first locations onto a reference surface, said first locations being associated with a steerable axle of the vehicle;
    indicating a plurality of second locations vertically below the member at each axle end whose relative position is to be determined and which second locations are axially outward of the axial extend to a respective tire associated with the axial end, each of the second locations indicated onto the reference surface on which the vehicle is supported;
    establishing the relative distance between selected pairs of the first and second locations indicated in said indicating steps; and
    calculating the relative position between the steerable and non-steerable axles as a function of the relative distances established in said establishing step.

2. The method set forth in claim 1, further including the step of determining an adjustment distance and location for at least one of the pair of vehicle axles as a function of the relative position of that axle.

3. The method set forth in claim 2, further including the step of displaying instructions for the adjustment distance and location determined in said determining step.

4. The method set forth in claim 2, wherein said adjustment distance has sufficient accuracy to give a scrub angle less than 0.14 degrees.

5. The method set forth in claim 1, further including the step of graphically displaying the relative position and angle of one axle with respect to another axle.

6. The method set forth in claim wherein a plurality of locations on the reference surface is such that a combination of locatins from any four axle ends wheels locating two axles forms a general quadrilateral with the sum of the interior angles being greater than 359.75 degrees and less than 360.25 degrees.

7. The method set forth in claim 1, wherein the step of establishing the relative distance between selected pairs of locations is accomplished using a linear distance measuring device.

8. An instrument for use in determining the relative position between a pair of vehicle axles, said instrument comprising:
    an extension means;
    means for connecting said extension means with each axial end of a non-steerable axle in a manner such that said extension means extends parallel to said non-steerable axle;
    means for indicating a pair of first locations vertically below a steerable axle onto a reference surface on which the vehicle is supported; and
    means for indicating a plurality of second locations vertically below said extension means onto the reference surface on which the vehicle is supported, said second locations being outward of the axial extend of a respective tire associated with the end of the axle.

9. The instrument set forth in claim 8, wherein the connecting means includes a contact pin to define the longitudinal center axis of the vehicle axle at an end of the axle.

10. The instrument set forth in claim 9, wherein the connecting means further includes a first bracket connectable with said contact pin, said first bracket including means for attaching to an end of an axle.

11. The instrument set forth in claim 10, wherein the connecting means further includes a second bracket having the extension means fixed thereto and movable relative to said first bracket to allow the extension means to be located vertically below the end of the axle, said second bracket further including means for fixing the position of the second bracket relative to the first bracket.

12. The instrument set forth in claim 11, wherein said position fixing means for said second bracket further including a leveling means attached to the second bracket to insure that the extension means is vertically below the axle axis.

13. The instrument set forth in claim 8, wherein said indicating means is a plum bob.

14. The instrument set forth in claim 8, wherein said indicating means is a laser that projects vertically a visual spot on the reference surface.

15. An instrument for use with an alignment system and for indicating a location of an end of a vehicle axle onto a reference surface on which the vehicle is supported, comprising
   a contact pin to define an end of the vehicle axle at a wheel of the vehicle being accessible from the exterior of the vehicle;
   a first bracket connectable to said contact pin using a first clamping device for attaching said first bracket to said contact pin at the end of the vehicle axle;
   a magnetic anchor device rigidly attached to said first bracket to support and hold said instrument at said end of the vehicle axle;
   a second bracket adjacent to and movable with respect to said first bracket, said second bracket further having a second clamping device to fix the position of the second bracket relative to the first bracket; and
   a member attached to said second bracket, said member having an axis parallel to the vehicle and positioned below said vehicle axle in a vertical plane containing said axle by using a leveling means attached by an adjustable device to said second bracket.

16. The instrument set forth in claim 15, further comprising:
   an indicator device connectable to an end of said member, said indicator device having a means for providing said location on said reference surface vertically below said end of the member outward of the axial extent of a tire, whereas a plurality of said locations, being one at each end of each axle, are used to align a pair of vehicle axles.

17. The instrument set forth in claim 16, wherein relative positions on the reference surface between selected pairs of the locations indicating two axles forms a general quadrilateral with the sum of the interior angles being greater than 359.75 degrees and less than 360.25 degrees.

18. The instrument set forth in claim 16, wherein the indicator device is a plum bob.

19. The instrument set forth in claim 16, wherein the indicator device is a laser that projects a visual spot on the surface in a vertical plane directly below said end of the member.

20. The instrument set forth in claim 16, wherein said alignment system can position two of the axles relative to each other with an accuracy to give a scrub angle less than 0.10 degrees.

21. An alignment system for determining a relative position and a correction for a pair of vehicle axles, said system comprising:
   means for providing an instrument having a member extending therefrom;
   means for connecting the instrument with each axial end of a non-steerable axle of the vehicle so the member extends parallel to the axle whose relative position is to be determined;
   means for indicating a pair of first locations onto a reference surface, said first locations being associated with a steerable axle of the vehicle;
   means for indicating a plurality of second locations vertically below the member at each end of the non-steerable axle and outward of the axial extent of a respective tire associated with the axial end, each of the second locations being indicated onto the reference surface on which the vehicle is supported;
   means for establishing the relative distance between selected pairs of the first and second locations indicated by the indicating means;
   means for calculating the relative position between the steerable and non-steerable axles as a function of the relative distances established by the establishing means;
   means for determining an adjustment distance and location for at least one of the pair of vehicle axles as a function of the relative position of steerable and non-steerable axles; and
   means for displaying instructions for the adjustment distance and location determined by the determining means.

* * * * *